UNITED STATES PATENT OFFICE.

NATHAN SULZBERGER, OF NEW YORK, N. Y.

DERIVATIVES OF METACRESOL WITH ORGANIC ACIDS.

1,033,841.

Specification of Letters Patent.   Patented July 30, 1912.

No Drawing.   Application filed April 28, 1911.   Serial No. 623,836.

*To all whom it may concern:*

Be it known that I, NATHAN SULZBERGER, a citizen of the United States of America, residing at Hotel Netherland, Fifty-ninth street and Fifth avenue, New York city, in the county of New York and State of New York, have invented new and useful Improvements in Derivatives of Metacresol with Organic Acids, of which the following is a specification.

It has been found that esters of meta-cresol with saturated organic acids containing more than three atoms of carbon are valuable antiseptics and disinfectants for pharmaceutical and other purposes, and also possess marked analgesic action while being in many cases practically devoid of the escharotic and caustic untoward action of the original meta-cresol from which they were formed. This lack and freedom of causing irritation makes it possible to utilize the very powerful antiseptic and analgesic action of meta-cresol—meta-cresol has been found a stronger germicide and at the same time less toxic than carbolic acid or the other cresols—even on very sensitive mucous membranes, as those for instance of the mouth, throat and nose.

As examples I shall describe the method after which have been produced meta-cresyl-butyrate

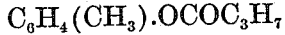

and meta-cresyl-iso-valerate

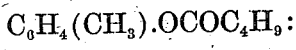

To meta-cresol was gradually added one molecule of butyryl-chlorid. During the addition of the chlorid the flask was gently warmed in order to aid the reaction. After all the chlorid had been added, the product was kept for about an hour at about 100 degrees C. The product was then washed with warm water, thoroughly mixing the same with the water and finally with a very dilute solution of sodium hydroxid until such water remained slightly alkaline in the presence of phenolphthalein. The butyrate was then separated from the water and dried and finally purified by distillation. In similar manner the meta-cresyl-iso-valerate was prepared. Both these products represent water-like liquids of agreeable odor which can be safely used in painting the mucous membranes of the mouth and throat without showing any escharotic action.

In similar manner other esters may be formed. I do not, however, limit myself to the above method of preparation, which can be variously modified as to quantity, temperature, etc. These esters may also be obtained by treating the mixture of the organic acid and meta-cresol with phosphorous-oxy-chlorid, etc. In fact, any method may be employed to produce phenol-esters of organic acids.

These new compounds represent, when made made from the lower organic acids, liquids of water-clear appearance, the boiling point of which increases as the number of atoms of carbon—*ceteris paribus*—increases in the organic acids employed. The esters of the higher fatty acid are not distillable any more without decomposition under ordinary pressure and are more or less of solid consistency. The odor of these esters becomes also less noticeable as the number of atoms of carbon in the acid increases. These esters are all split by the action of caustic-soda into their component parts. Derivatives of these esters, as for instance, chlorin-bromin-, etc., meta-cresyl-esters, and also esters derived from substituted fatty acids, come under the scope of this invention. These esters are all insoluble in water. If they are to be used in water, they may be used in the form of an emulsion prepared by the addition of soap, certain salts, alcohol, in which latter the lower esters are very readily soluble. These esters may also be used in their mixtures with each other, being made from commercially more or less impure fatty acids as well as inartificial mixtures. They may also be mixed with other chemicals and also with substances of a fatty or oily nature of animal, vegetable and mineral origin. They are solvents, as for instance, for iodin, etc. Such solutions are very valuable pharmaceutically as well as sterilizers for other purposes—for instance, a solution containing about 2% iodin in meta-cresyl-butyrate.

I claim:

1. Esters of saturated organic acids having more than three atoms of carbon with meta-cresol, insoluble in water and split by the action of caustic-soda into the sodium-salt of meta-cresol and the fatty acid, from which the ester was derived.

2. Esters and derivatives of esters of saturated organic acids having more than three atoms of carbon with meta-cresol, insoluble in water and split by the action of caustic soda into their component parts.

3. Meta-cresyl-butyrate representing a water-like liquid, insoluble in water, soluble in alcohol and split by the action of caustic soda into the sodium-salt of meta-cresol and sodium-butyrate.

NATHAN SULZBERGER.

Witnesses:
 JOHN T. COLWELL,
 GEORGE H. OREAD.